United States Patent [19]

Duncan, Jr. et al.

[11] Patent Number: 5,780,805
[45] Date of Patent: Jul. 14, 1998

[54] PATTERN SHIFTING LASER CUTTER

[75] Inventors: Marvin H. Duncan, Jr.; Michael L Silverglate, both of Marblehead, Mass.

[73] Assignee: Gerber Garment Technology, Inc., Tolland, Conn.

[21] Appl. No.: 433,704

[22] Filed: May 3, 1995

[51] Int. Cl.[6] ............................................ B23K 26/00
[52] U.S. Cl. ........................... 219/121.68; 219/121.72; 219/121.78; 364/474.08
[58] Field of Search .................. 219/121.67, 121.68, 219/121.72, 121.78, 121.79, 121.81, 121.85; 364/470, 474.08

[56] References Cited

U.S. PATENT DOCUMENTS

| | | |
|---|---|---|
| 3,134,010 | 5/1964 | Bettermann et al. |
| 3,596,068 | 7/1971 | Doyle |
| 3,761,675 | 9/1973 | Mason et al. |
| 3,855,887 | 12/1974 | Pearl et al. |
| 3,864,997 | 2/1975 | Pearl et al. |
| 3,875,389 | 4/1975 | McFadden et al. |
| 3,887,903 | 6/1975 | Martell |
| 3,889,095 | 6/1975 | Egan ........................... 219/121.85 |
| 3,895,358 | 7/1975 | Pearl |
| 3,927,591 | 12/1975 | Gerber |
| 4,112,797 | 9/1978 | Pearl |
| 4,328,726 | 5/1982 | Pearl |
| 4,391,168 | 7/1983 | Gerber et al. |
| 4,547,855 | 10/1985 | Lanyi et al. ................. 364/474 |
| 4,583,181 | 4/1986 | Gerber et al. |
| 4,740,668 | 4/1988 | Perez |
| 4,853,866 | 8/1989 | Galan et al. |
| 4,901,359 | 2/1990 | Bruder |
| 4,942,284 | 7/1990 | Etcheparre et al. |
| 4,961,149 | 10/1990 | Schneider et al. |
| 4,982,437 | 1/1991 | Loriot |
| 5,061,342 | 10/1991 | Jones |
| 5,073,694 | 12/1991 | Tessier et al. ............. 219/121.71 |
| 5,089,971 | 2/1992 | Gerber |
| 5,172,326 | 12/1992 | Campbell, Jr. et al. |
| 5,257,706 | 11/1993 | McIntyre |
| 5,331,131 | 7/1994 | Opdyke |
| 5,338,915 | 8/1994 | Hildebrand et al. |

*Primary Examiner*—Mark H. Paschall
*Attorney, Agent, or Firm*—Cumpston & Shaw

[57] ABSTRACT

A method and apparatus for cleaning a support surface during successive cuts of a sheet material along a common cutting path by a laser. The method includes offsetting the location of the common cutting path with respect to the support surface for subsequent cuts. The offset distance is sufficient to align a portion of the common cutting path with a portion of the ridge of debris formed during a previous cut such that upon tracing the subsequent path with the laser, the previously formed ridge of debris is ablated.

6 Claims, 4 Drawing Sheets

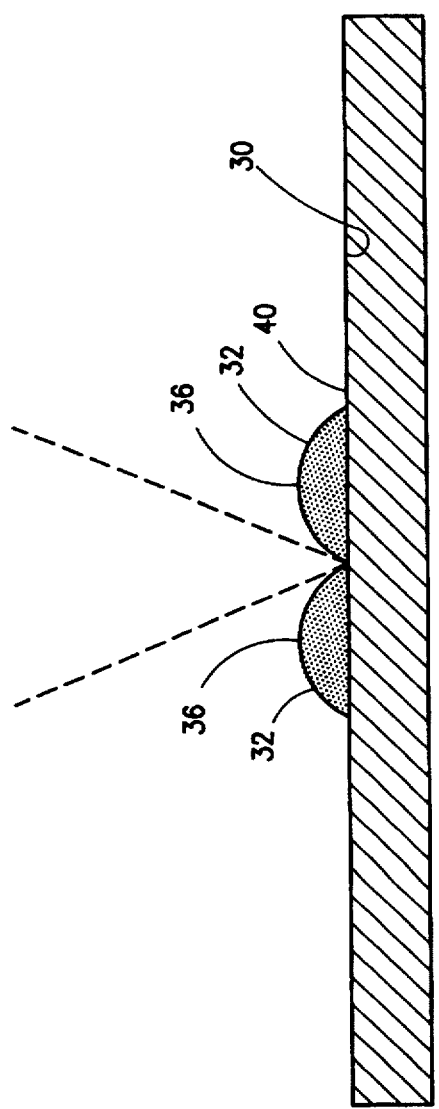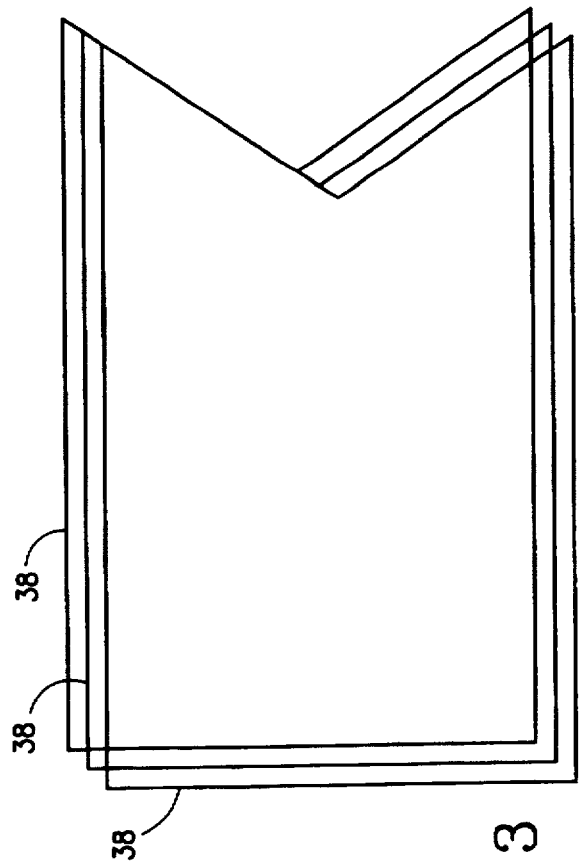
FIG. 2
FIG. 3

5,780,805

PATTERN SHIFTING LASER CUTTER

FIELD OF THE INVENTION

The present invention relates to laser cutting systems, and more particularly, to a laser cutting system for cleaning a support surface of debris generated during previous cuts along a common path.

BACKGROUND OF THE INVENTION

Laser cutting systems are capable of cutting sheet material accurately, repeatedly and rapidly. Such systems often include a sheet material support surface and a laser cutter for cutting the sheet material. Generally, the sheet material is placed on the support surface and aligned with a reference mark.

During the cutting or ablation of sheet material upon the support surface, the laser penetrates the material along a cut line and contacts the support surface. The laser ablation forms a row of debris, such as ash and reside on either side of the cut line. The debris accumulates on the support surface, and the heat from the ablation may bond portions of the debris to the support surface. The problem is especially acute when the laser cutting system is employed to repeatedly cut along a common path. As successive cuts are made along the common path, the adjacent ridges of ablation debris continue to increase in size, and eventually reach a dimension sufficient to distort the sheet material so that an accurate cut of the material is no longer achieved. The system must then be shut down while the support surface is either cleaned or replaced.

Therefore, the need exists for a system for cutting successive sheets of material in a common pattern on a support surface with reduced down time or cleaning requirements. A further need exists for a method of cutting successive sheets with a common pattern without requiring excessive adjustment or recalibration of the system.

SUMMARY OF THE INVENTION

The present invention provides for the ablation of debris formed from previous cuts along a common cutting path during a subsequent trace of a laser along the common cutting path. Specifically, the present invention includes positioning a sheet material and common cutting path in a first position with respect to the support surface; directing a laser along the common cutting path in the first position to cut the material and form a first adjacent ridge of debris, and displacing the common cutting path to a second position for the cutting of a second sheet of material to substantially align at least a portion of the common cutting path in the second position with the first adjacent ridge of debris, such that upon directing the laser along the portion of the common cutting path in the second position the laser penetrates the material and contacts the first adjacent ridge of debris to substantially ablate the first adjacent ridge.

A corresponding apparatus includes a support surface, a laser cutter and a program running in a controller for offsetting successive traces of a common cutting path by a sufficient distance so that a trace of the laser cutter along the common path ablates an adjacent ridge of debris formed during a prior trace. Specifically, subsequent locations of the common cutting path are offset by a distance substantially equal to the distance between the common cutting path and the crest of an adjacent ridge of debris formed during a trace of the common cutting path by the laser.

BRIEF DESCRIPTION OF THE FIGURES

FIG. 2 is a cross sectional elevational view showing the adjacent ridges of debris along a cut line;

FIG. 3 is a top plan view showing multiple successive movements of the cut path relative to the support surface;

DETAILED DESCRIPTION OF THE PREFERRED EMBODIMENTS

Figure 1:
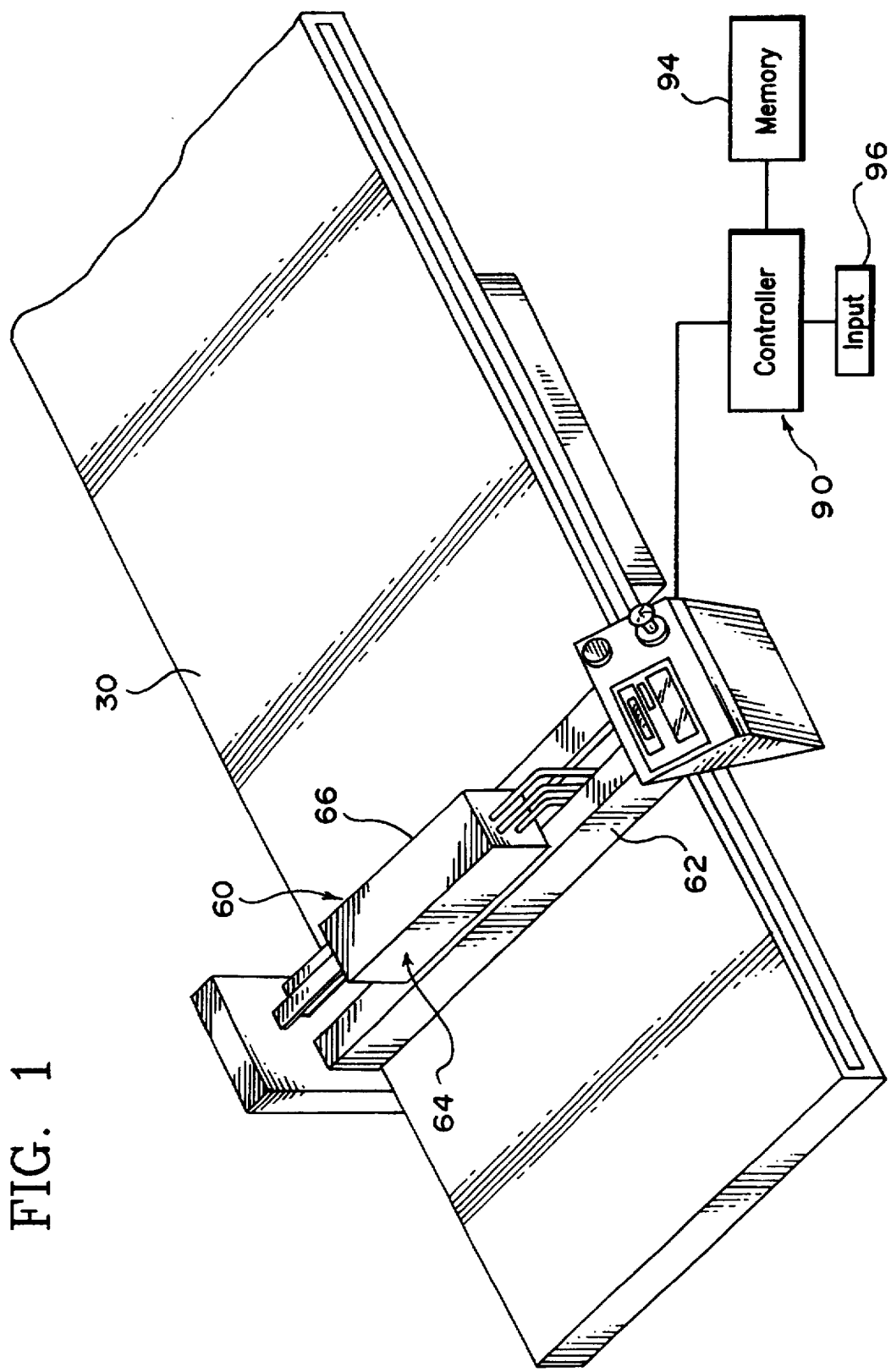
FIG. 1 is a perspective view of a laser cutting system.
Figure 4:
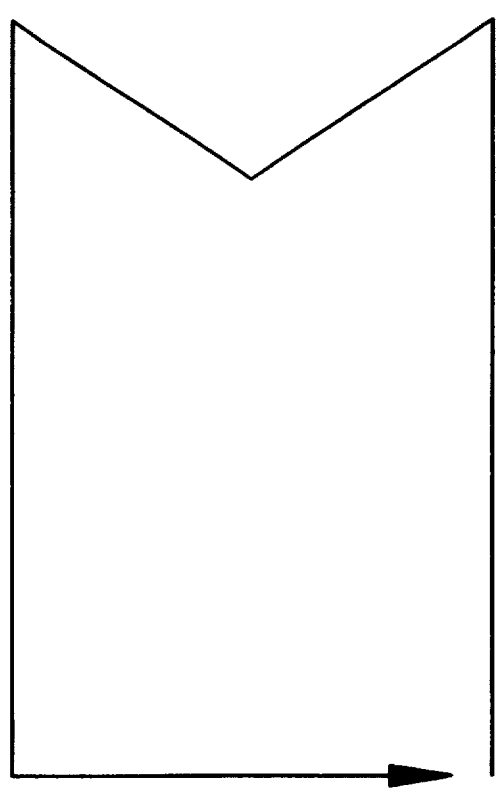
FIG. 4 is a top plan view of a simple part periphery showing a first position of the common cut path.

Referring to FIG. 1, the system includes a support surface 30, a cutter assembly 60, and a cutter controller 90.

The support surface 30 may be any of a variety of structures without departing from the broader aspects of the invention. Preferably, it is a bed formed of an aluminum sheet. If desired, one or more vacuum chambers can be provided beneath a penetrable bed. Air passages extend through the bed so that the lay up can be compressed and a sheet material 40 firmly held against the support surface 30 during the cutting operation.

The support surface 30 is sufficiently long to accommodate a number of spread sheets. Typically, the support surface may have a length of 50 feet or more. Alternatively, the support surface 30 may be a conveyor which transports sections of the sheet material past a number of stations.

The cutter assembly 60 includes a gantry 62 movable relative to the support surface 30 along the length of the support surface in an X direction. The gantry 62 carries a Y-carriage 64 movable perpendicular to the length of the support surface 30. The Y-carriage 64 carries a laser cutter 66.

The laser cutter 66 includes a laser beam generator mounted to the cutter assembly 60, and a laser cutting head supported by the Y-carriage 64 for movement in a direction parallel to and above the support surface 30. The laser cutting head includes a focusing lens. The laser beam is initially directed from the generator toward the mirror, then reflected by the mirror along a path to be focused by the lens onto the sheet material located on the support surface 30. By way of example, the laser beam is focused to a 0.002 inch diameter spot on the sheet material. A preferred laser is Coherent General Diamond Series.

The cutter controller 90 controls the cutter assembly 60 as well as movement of the laser cutter 66. The cutter controller 90 includes a computer such as an IBM compatible PC that accesses a database of cutting instructions such as a marker, or part peripheries. The cutter controller 90 includes or has access to a memory 94 for storing the database. Operator input to the computer is accomplished through standard input devices 96 including a keyboard or remote pointing device, such as a mouse/track ball. The remote pointing device may include a plurality of buttons as well as the track ball for moving a pointer or indictor. The cutter controller 90 also includes a motion controller, such as a DMC-600 from Galil for effecting motion of the gantry 62, Y-carriage 64 and the cutter. Industry available software is employed to effect motion of the cutter along a path in response to the database.

It is understood that those skilled in the art may employ software to directly control the gantry 62, cutter, conveyor (if used), all critical input and output such as an emergency stop and cutter termination and other safety related functions, if present, using an operating system in the cutter controller 90. Alternatively, a commercially available Computer Numerical Control (CNC) controller may be provided between peripheral devices such as the scanners and digitizers and the work station to directly control the devices. CNC controllers are widely available from many suppliers such as Model 8400 marketed by Alan Bradley (Cleveland, Ohio).

Referring to FIG. 2. during the laser cutting, the focused laser beam ablates the local area of the sheet material and contacts the support surface 30. The heat and energy dissipated at the site of ablation form an adjacent ridge of debris 32 along each side of the cut. Further, depending upon the material and the translation speed of the laser beam, the debris 32 may retain sufficient heat to adhere a bond to the support surface 30.

As shown in FIG. 2. the adjacent ridges 32 of ablation debris have a generally bell shaped profile, including a crest 36 defining the highest portion of the ridge. Depending upon the cutting parameters such as beam translation; size; and composition of the sheet material the crest 36 of the ridge 32 is spaced from the center of the beam path by a ridge distance RD.

As subsequent sheets of material 40 are placed on the support surface 30 and a common cutting path 38 is traced by the laser, the debris ridge 32 may locally distort the sheet material, thereby undesirably altering the cutting path.

As shown in FIGS. 4–7. the present program runs in the controller 90 for shifting or offsetting the common cutting path 38 relative to the support surface 30 for each successive trace of the common cutting path by the laser. That is, the location of the entire common cutting path 38 is shifted or offset from a previous location of the common cutting path by a sufficient distance to align at least a portion of the common cutting path in the subsequent position with a portion of the debris ridge 32 formed in a trace of the common cutting path in a prior position cut. The subsequent locations are selected so that as the laser follows the common cutting path 38 in subsequent locations, the laser contacts at least a portion of a previously formed debris ridge 32 on the support surface 30 and ablates or disintegrates the ridge. That is, the subsequent locations of the common cutting path are selected to maximize the overlap of the common cutting path 38 and the previously formed ridge of debris 32. Preferably, the overlap aligns the subsequent cut paths with the crest 36 of the prior ridge 32.

If the sheet material 40 is marked to permit the local relocation of subsequent cut paths 38 within a marker, then each sheet may be identically located with respect to the support surface. Alternatively, if the marker for the sheet material 40 cannot be offset or adjusted within the sheet material, the subsequent sheets may be offset or relocated with respect to the support surface 30. In either scenario, the location of the cut path 38 relative to the support surface 30 is shifted or offset by a distance sufficient to align a portion of the subsequent cut path with the debris ridge 32 formed during a previous trace of the cut path. It is also contemplated that the common cutting path 38 may only be a portion of the entire bite being cut. That is, each bite may include a common part located in a recurring position, accompanied by a varying group of parts. Therefore, the periphery of the common part defines the common cutting path 38 which is respectively offset. Further, the entire marker may be offset, or as the offsetting may be of an order less than an inch, only the common part periphery is offset for successive cuts. It is understood the term "sheet material 40" includes individual sheets or segments of material as well as separate bites in an elongated sheet or roll of material.

The common cutting path 38 is defined by a set of points that define the periphery of a part to be separated from the sheet material 40. In the shifting or offsetting of the cutting path 38, the relative position of all the points remain constant and each point in the path is moved by an equal vector.

Figure 7:
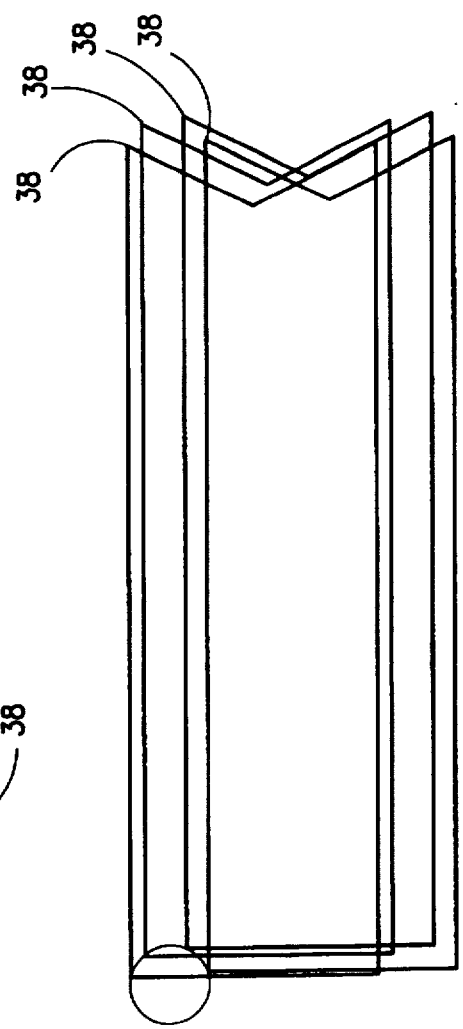
FIG. 7 is a top plan view showing multiple successive movements of the cut path about a closed loop.

Referring to FIG. 7, in an embodiment, the cutting path 38 may be translated about a circumference of a closed loop path or small circle 50 having a diameter of approximately ⅛ to ½ inch. That is, after the cutting path 38 in a given location is traced by the laser for a first sheet of material 40, the location of the cutting path 38 for the subsequent cut is shifted along an arc defined by a circle having a diameter of approximately ⅛ to ½ inch. After 2, 4, 6 or 8 cuts, the cutting path 38 returns to its original location or position. The shifting of the cutting path 38 causes the laser to contact the ridges 32 formed by previous cuts and thereby self cleans the support surface 30. While a closed loop is described, an open spiral or other path may be employed.

Figure 5:
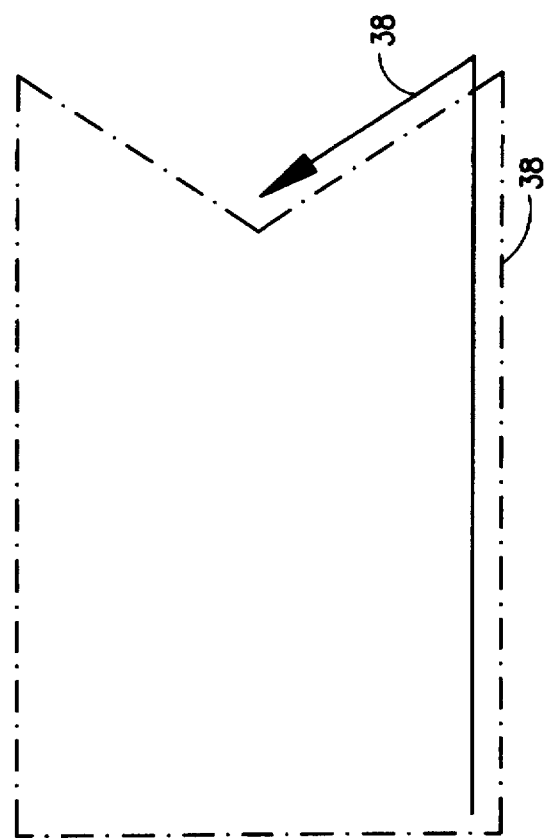
FIG. 5 is a top plan view of the simple part periphery in a second position.
Figure 6:
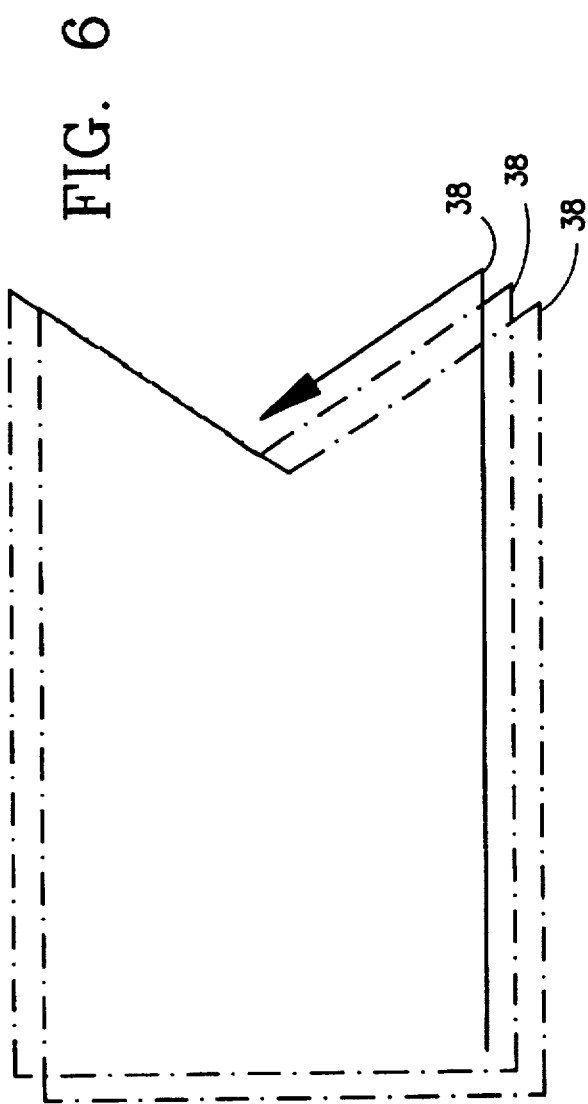
FIG. 6 is a top plan view of the simple part periphery in a third position.

The offsetting of the common path 38 is such that the overlap between the offset location and the debris ridge 32 is maximized, for either the next successive cut or the cumulative successive generation of offsets. That is, for some path geometries an offset in a single X or Y direction may maximize overlaps for the next immediate cut. As shown in FIGS. 5 and 6, the offset may be a combination of X and Y vectors. Alternatively, offsetting about a portion of a circle, or other closed loop geometry may maximize overlap for a set of offsets thereby reducing additional cleaning steps.

In addition, the displacement of the cutting path 38 about the circle or closed loop may be selected such that upon subsequent rotations about circle, the locations of the cutting path do not exactly repeat. That is, the cutting path 38 may be rotated by 27° about a circle for each trace. Alternatively, the movement about the circle may be random to reduce the chances of repeating locations during subsequent cuts.

In cutting systems employing a moveable or conveyor type support surface, conveyor travel and location of the cutting path 38 may be coordinated so that subsequent traces of the cutting path are offset about the closed loop. Alternatively, the cutting path 38 may be shifted between successive cuts in only one of the X (longitudinal) direction of the sheet material or the perpendicular Y direction, thereby at least removing a portion of the ablation debris.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed:

1. A method of ablating debris from a support surface during repeated cuttings of segments of a material along a common cutting path, comprising:

(a) positioning the common cutting path in a first position with respect to the support surface;

(b) directing a laser along the common cutting path in a first cutting to cut a first segment of the material and form a first adjacent debris ridge;

(c) disposing a second segment of the sheet material on the support surface: and (d) displacing the common cutting path for a second cutting to a second position positioned over a portion of the first adjacent debris ridge such that upon directing the laser along the portion of the common cutting path in the second cutting, the laser penetrates the second segment of the sheet material and contacts the portion of the first adjacent debris ridge to substantially ablate the debris.

2. The method of claim 1, wherein displacing the common cutting path includes repeatedly displacing the cutting path so that a point thereon traverses along a closed loop.

3. The method of claim 2, wherein displacing the common cutting path includes displacing the cutting path so that a point thereon traverses a circle.

4. The method claim 3, further comprising displacing the common path by a segment length of approximately ¼, ⅛, ⅙ of a circle.

5. A method of ablating a ridge of laser ablation debris from a prior cutting of a sheet material during a subsequent cutting of sheet material with a laser on a support surface, comprising:

(a) displacing the common cutting path from a first position in the prior cutting along the common cutting path to a second position to substantially align a portion of the common cutting path in the second position with a portion of the ridge of laser ablation debris formed in the prior cutting, such that upon directing the laser along the portion of the common cutting path in the second position, the laser penetrates the sheet material and contacts the portion of the ridge of laser ablation debris.

6. A method of ablating a ridge of debris on a support surface from a prior laser cutting of a first segment of sheet material during a subsequent cutting of a second segment of sheet material on the support surface along a second path with a laser, comprising:

(a) aligning a portion of the second path with the debris from the prior laser cutting, such that upon directing the laser along the length of the second path, the laser penetrates the sheet material and ablates the portion of the ridge of debris.

* * * * *